United States Patent
Tang (10) Patent No.: US 8,096,626 B2
(45) Date of Patent: Jan. 17, 2012

(54) LATCHING MECHANISM FOR FOLDING DRIVE BAY DOOR

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 808 days.

(21) Appl. No.: 12/191,281

(22) Filed: Aug. 13, 2008

(65) Prior Publication Data

US 2009/0213713 A1  Aug. 27, 2009

(30) Foreign Application Priority Data

Feb. 25, 2008 (CN) .......................... 2008 1 0300394

(51) Int. Cl.
  *A47B 81/00* (2006.01)
  *A47B 97/00* (2006.01)
  *A47B 95/02* (2006.01)
(52) U.S. Cl. .................. 312/223.2; 312/319.2
(58) Field of Classification Search ............... 312/223.2, 312/327, 328, 325, 319.2, 9.41, 9.42; 206/307; 361/755, 800–803, 807, 810; 49/73.1, 74.1; 720/646, 647; 16/90, 91, 412, 415, 418
See application file for complete search history.

(56) References Cited

U.S. PATENT DOCUMENTS

| | | | | |
|---|---|---|---|---|
| 5,458,412 A * | 10/1995 | Lee et al. | | 312/309 |
| 5,875,521 A * | 3/1999 | Woo | | 16/280 |
| 5,941,615 A * | 8/1999 | Ito et al. | | 312/7.2 |
| 6,305,897 B1 * | 10/2001 | Budd et al. | | 414/540 |
| 7,055,160 B1 * | 5/2006 | Tan et al. | | 720/647 |
| 7,639,495 B2 * | 12/2009 | Chen et al. | | 361/679.6 |
| 7,855,898 B2 * | 12/2010 | Tang | | 361/801 |
| 2005/0011041 A1 * | 1/2005 | Ness | | 16/105 |
| 2005/0034139 A1 * | 2/2005 | Kim | | 720/647 |
| 2005/0257231 A1 * | 11/2005 | Hibi | | 720/647 |
| 2005/0289571 A1 * | 12/2005 | Lee et al. | | 720/646 |
| 2006/0156320 A1 * | 7/2006 | Lee | | 720/647 |
| 2007/0075612 A1 * | 4/2007 | Zhao | | 312/223.2 |
| 2008/0109989 A1 * | 5/2008 | Sprague | | 16/91 |
| 2008/0222666 A1 * | 9/2008 | Lee et al. | | 720/647 |
| 2011/0209306 A1 * | 9/2011 | Pritz et al. | | 16/91 |

FOREIGN PATENT DOCUMENTS

TW      M313293      6/2007

* cited by examiner

*Primary Examiner* — Darnell M Jayne
*Assistant Examiner* — Andrew Roersma
(74) *Attorney, Agent, or Firm* — Altis Law Group, Inc.

(57) ABSTRACT

An exemplary latching mechanism for folding drive bay door (10) includes a cover panel (12), two brackets (14), two link members (184), a rotatable member (16), and two elastic members (22). The cover panel is configured for covering an entrance of an electronic device. The cover panel forms two pivotally rotatable portions (122) on opposite ends. The brackets are fixed to the electronic device. Each of the brackets defines a guiding hole for receiving the pivotally rotatable portions of the cover panel. Opposite ends of each link member are rotatably connected to the cover panel and the rotatable member correspondingly. The rotatable member is rotatably connected to the brackets. Two ends of each elastic member resist one of the two brackets and the rotatable member correspondingly.

13 Claims, 7 Drawing Sheets

LATCHING MECHANISM FOR FOLDING DRIVE BAY DOOR

BACKGROUND OF THE INVENTION

1. Field of the Invention

The present invention relates to latching mechanisms and, more particularly, to a latching mechanism for folding drive bay door.

2. Discussion of the Related Art

Optical disk drives are widely used to access video, audio, and data files stored on optical disks. A computer enclosure generally defines an opening for receiving and installing the optical disk drive. A folding drive bay door is configured for covering the entrance. The purpose of having a folding drive bay door is to prevent dust and other particles from entering the personal computer. The folding drive bay door can be opened or closed relative to the entrance via latching mechanism.

A typical latching mechanism for the folding drive bay door includes a hinge. The folding drive bay door is connected to the personal computer via the hinge. The folding drive bay door is rotatable about the hinge.

However, in order to have a folding drive bay door able to open completely relative to the personal computer, a slot is defined between the folding drive bay door and the personal computer when the hinge is attached to the folding drive bay door and the personal computer. Thus, the appearance of the personal computer is not very good.

Therefore, a latching mechanism for folding drive bay door which leads to an electronic device with a nice appearance is desired.

SUMMARY

A latching mechanism for folding drive bay door includes a cover panel, two brackets, two link members, a rotatable member, and two elastic members. The cover panel is configured for covering an entrance of an electronic device. The cover panel forms two pivotally rotatable portions on opposite ends. The brackets are fixed to the electronic device. Each of the brackets defines a guiding hole for receiving the pivotally rotatable portions of the cover panel. Opposite ends of each link member are rotatably connected to the cover panel and the rotatable member correspondingly. The rotatable member is rotatably connected to the brackets. Two ends of each elastic member resist one of the two brackets and the rotatable member correspondingly.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present latching mechanism for folding drive bay door. Moreover, in the drawings, like reference numerals designate corresponding parts throughout the several views, and all the views are schematic.

DETAILED DESCRIPTION OF THE EMBODIMENTS

The present invention provides a latching mechanism for folding drive bay door, such as a door for covering an optical disk drive bay or a floppy disk drive bay. The latching mechanism is generally employed in various electronic products, such as notebook computers and personal computers.

Figure 1:
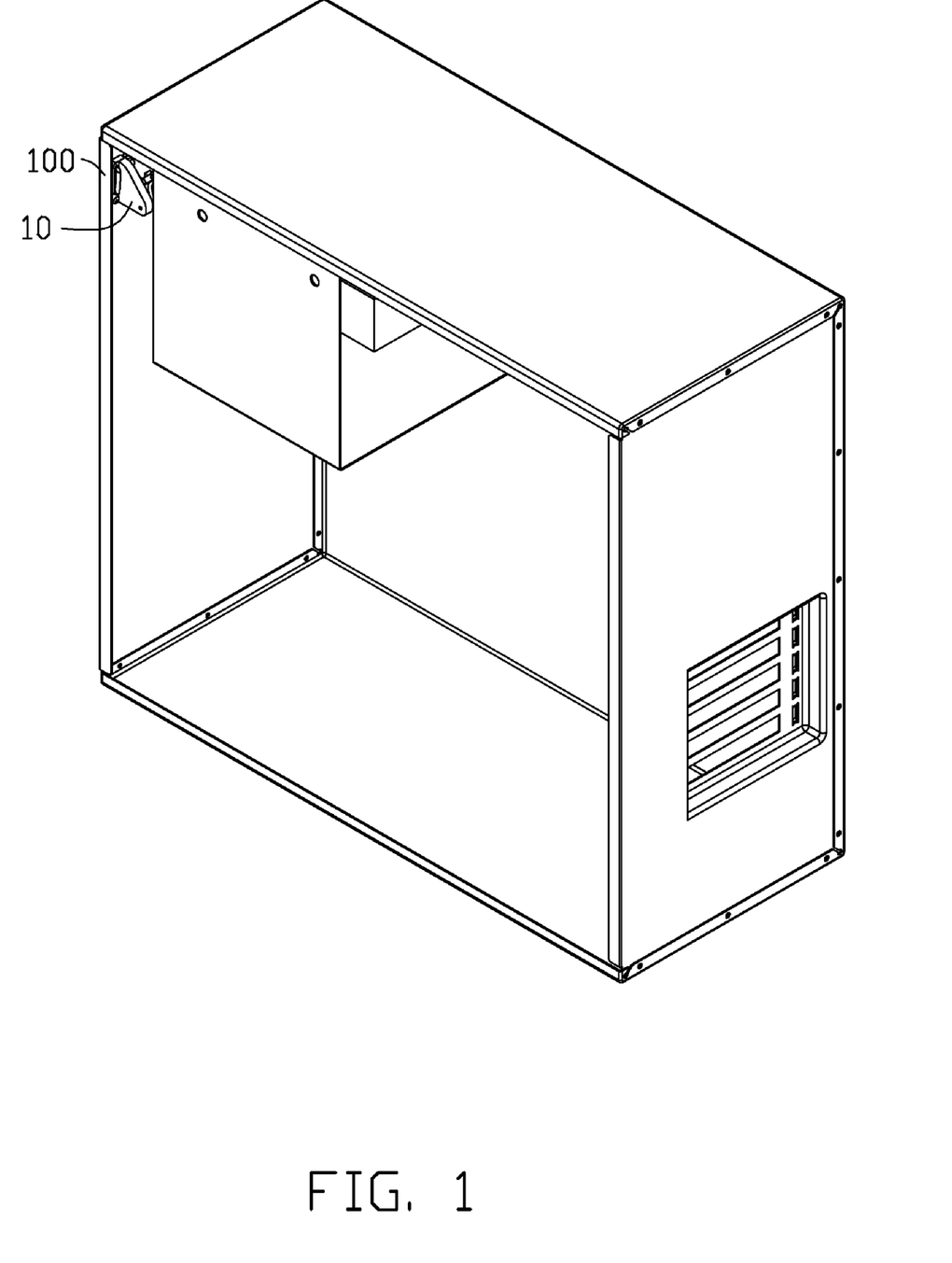
FIG. 1 is an isometric view of an exemplary embodiment of a latching mechanism for folding drive bay door of the present invention, being applied to a personal computer.
Figure 2:
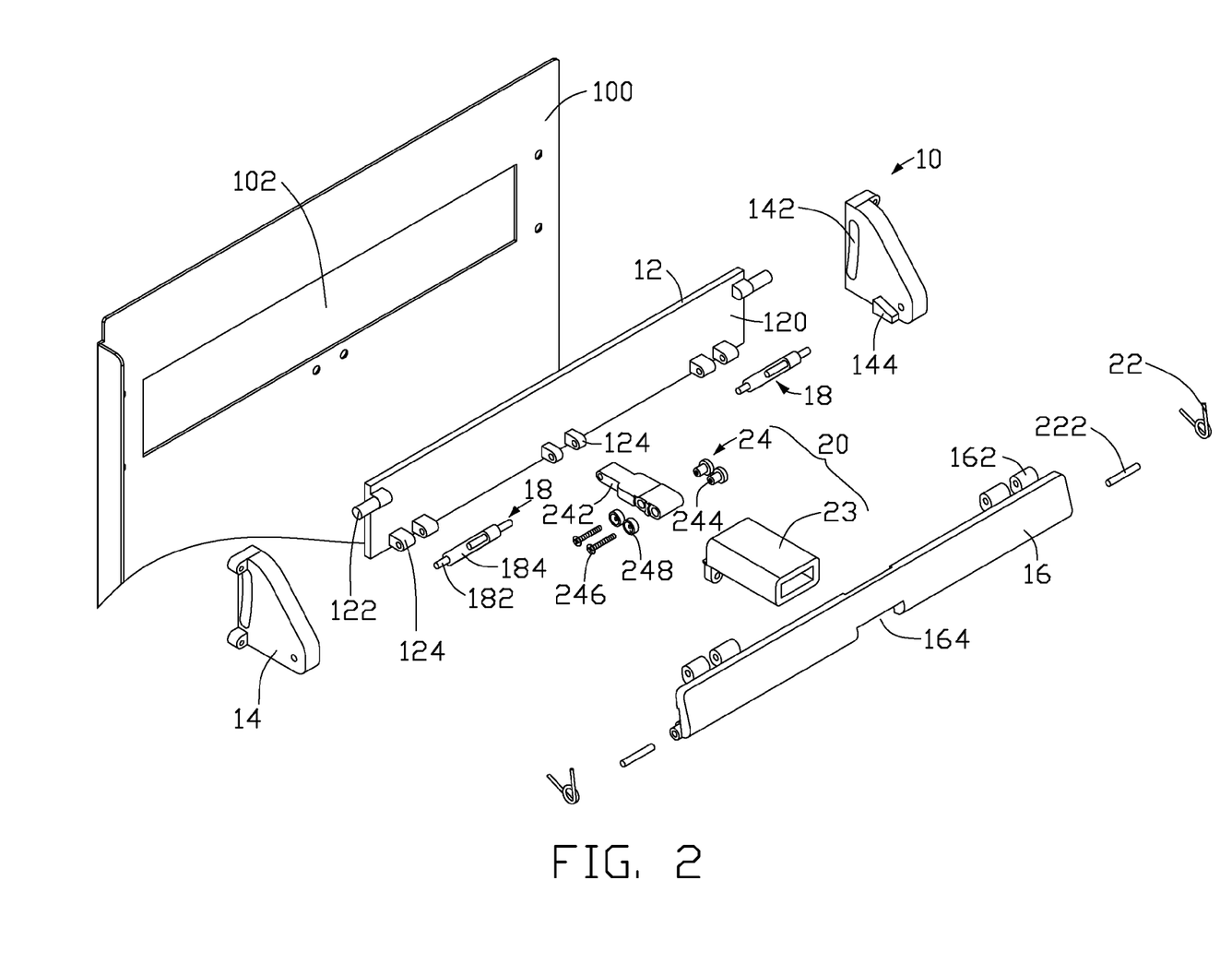
FIG. 2 is an exploded, isometric view of the latching mechanism for folding drive bay door in FIG. 1.
Figure 3:
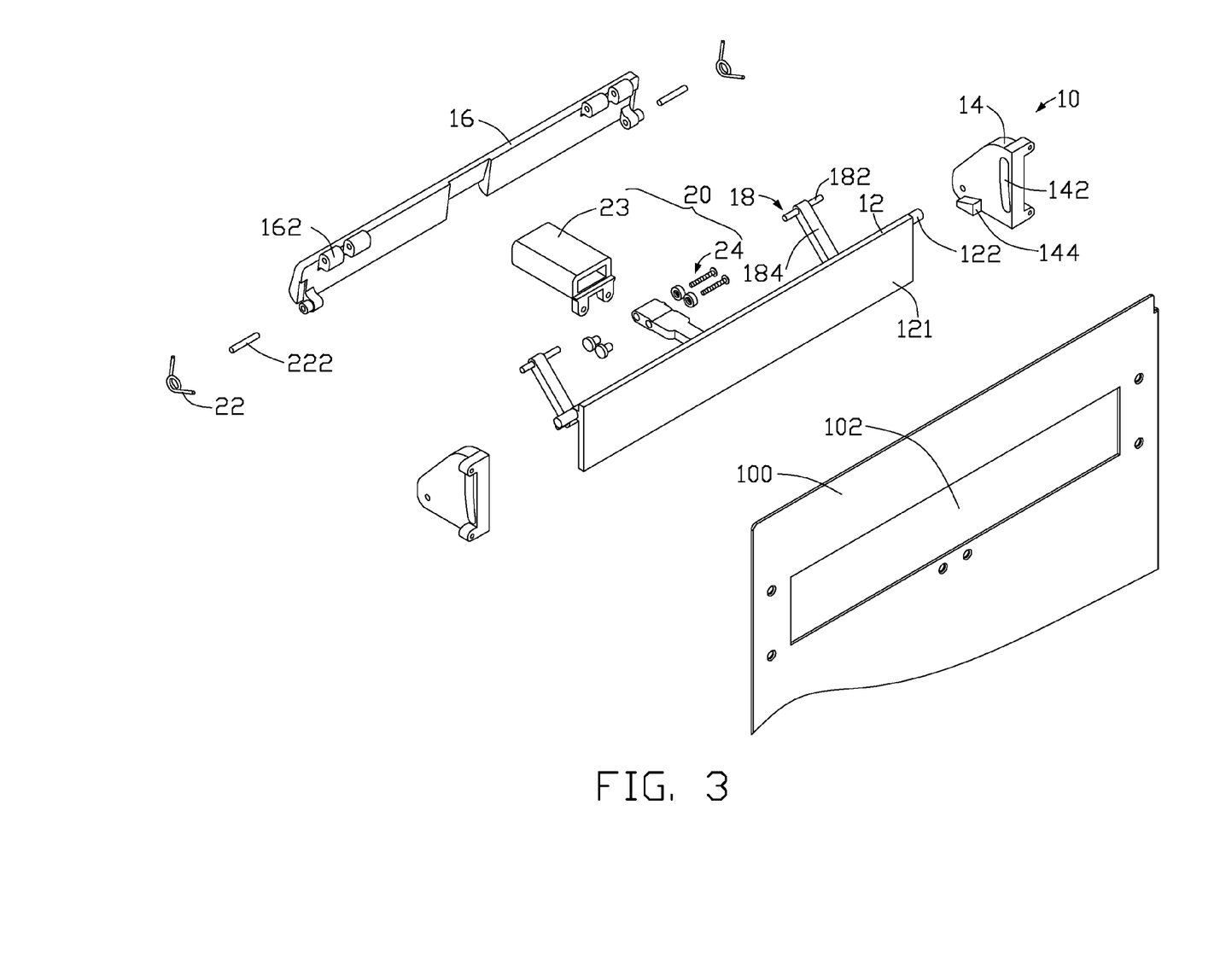
FIG. 3 is similar to FIG. 2, but shows a view from an opposite aspect.

Referring to FIGS. 1 through 3, a latching mechanism for folding drive bay door 10 of an exemplary embodiment of the present invention is employed in a personal computer (not labeled). The personal computer enclosure includes a first panel 100 such as a front panel and a drive bay opening 102 defined in the first panel 100. The latching mechanism for the folding drive bay door 10 is attached to the personal computer.

The latching mechanism for the folding drive bay door 10 includes a cover panel 12, a pair of brackets 14, a rotatable member 16, a pair of connecting subassemblies 18, a rolling subassembly 20, and a pair of elastic members 22.

The cover panel 12 is substantially a rectangular sheet, and configured for covering the entrance 102 of the first panel 100. The cover panel 12 includes an inner surface 120 and an outer surface 121 opposite to the inner surface 120. Two cylindrical pivotally rotatable portions 122 extend from opposite ends of the inner surface 120 respectively. The axes of the pivotally rotatable portions 122 are aligned on a same line. Six ears 124 are formed on the inner surface 120. The ears 124 are arranged into three pairs. The three pairs of ears 124 are evenly aligned on a bottom end of the inner surface 120. Each ear 124 defines a through hole (not labeled) for attaching the connecting subassemblies 18 and the rolling subassembly 20 to the cover panel 12.

Each bracket 14 is substantially a right-angled triangle sheet, and defines a guiding hole 142 and three connecting holes (not labeled). The guiding holes 142 are approximately strip-shaped. The guiding holes 142 are configured for guiding and restricting the movement of the pivotally rotatable portions 122 of the cover panel 12. Each bracket 14 forms a resisting portion 144 configured for resisting the elastic members 22. The rotatable member 16 is rotatably connected to the brackets 14 via the connecting holes of the brackets 14 and two first connecting members 222. The brackets 14 are fixed to the first panel 100 of the personal computer, with the two resisting portions 144 facing each other. Alternatively, the brackets 14 and the first panel 100 of the personal computer may be integrally formed.

The rotatable member 16 is substantially an arched plate. One side of the rotatable member 16 form two pairs of connecting portions 162 on each opposite end respectively. The other side opposite to the connecting portions 162 defines a groove 164. The connecting portions 162 are configured to rotatably attach the connecting subassemblies 18 to the rotatable member 16.

Each of the connecting subassemblies 18 includes two second connecting members 182 and a link member 184.

Opposite ends of the link member 184 define a through hole (not shown) correspondingly. The link members 184 are rotatable relative to the cover panel 12 and the rotatable member 16. Alternatively, the number of the connecting subassemblies 18 may be only one or more than two.

The rolling subassembly 20 includes a sleeve 23 and a rolling member 24. The sleeve 23 is substantially a hollow cuboid. One end of the sleeve 23 is fixed to the first panel 100 of the personal computer, and the other end of the sleeve 23 is partially engaged in the groove 164 of the rotatable member 16.

The elastic members 22 are torsion springs. In alternative embodiments, the number of the elastic members 22 may be only one or more than two.

The rolling module 24 includes a casing 242, two rollers 244, two bolts 246, and two covers 248. One end of the casing 242 is rotatably connected to the middle ears 124 of the cover panel 12. The other end of the casing 242 defines two engaging holes (not labeled) for assembling the rollers 244 and the covers 248. Each roller 244 defines a threaded hole (not labeled). The covers 248 are substantially hollow cylinders.

In assembly, the brackets 14 and the sleeve 23 of the rolling subassembly 20 are fixed to the first panel 100 of the personal computer. The pivotally rotatable portions 122 of the cover panel 12 are inserted into the guiding holes 142 of the brackets 14 correspondingly. A first end of each link members 184 is rotatably connected to the ears 124 of the cover panel 12 via the second connecting members 182. Then, each of the bolts 246 is passed through one cover 248 and one engaging hole of the casing 242, and then engages with one roller 244. Thus, the rolling member 24 is assembled. The rollers 244 and the covers 248 can rotate about the axes of the bolts 246. After that, the rolling member 24 of the rolling subassembly 20 is rotatably connected to the ears 124 of the cover panel 12. The rolling member 24 is received in the sleeve 23.

Each of the first connecting members 222 is passed through the connecting hole of each bracket 14, one of the elastic members 22, and a through hole of the rotatable member 16 in that order, so that the elastic members 22 are attached between the brackets 14 and the rotatable member 16. Two ends of each elastic member 22 resist the resisting portion 144 of the bracket 14 and a side surface of the rotatable member 16 correspondingly. The rotatable member 16 is rotatable about the axes of the first connecting members 222 when applied an external force. At last, a second end opposite to the first end of the link member 184 is rotatably connected to the connecting portions 162 of the rotatable member 16. The sleeve 23 is partially engaged in the groove 164 of the rotatable member 16.

Figure 4:
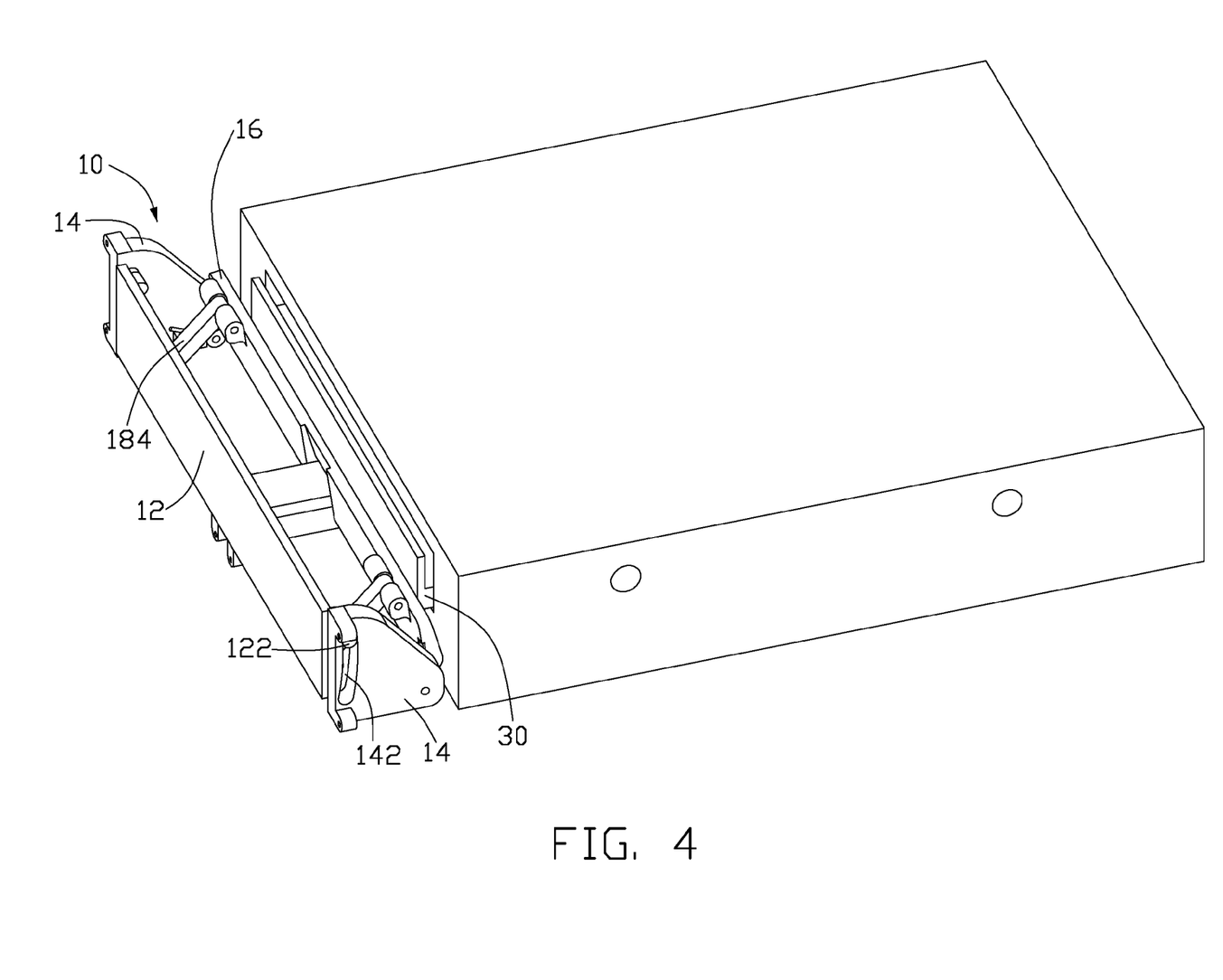
FIG. 4 is an assembled, isometric view of the latching mechanism for folding drive bay door in FIG. 2, showing the cover panel in a closed state.

Referring to FIGS. 2 and 4, an optical disk drive 30 is installed inside the personal computer in a movable way, and can slide out of or slide into the personal computer. In use, when the optical disk drive 30 is received in the personal computer, the cover panel 12 covers the entrance 102 of the personal computer. Each of the pivotally rotatable portions 122 of the cover panel 12 resists one end of an inner surface for forming the guiding hole 142. The link members 184 are parallel to each other. Angles between the link members 184 and the cover panel 12 and the rotatable member 16 are acute angles.

Figure 5:
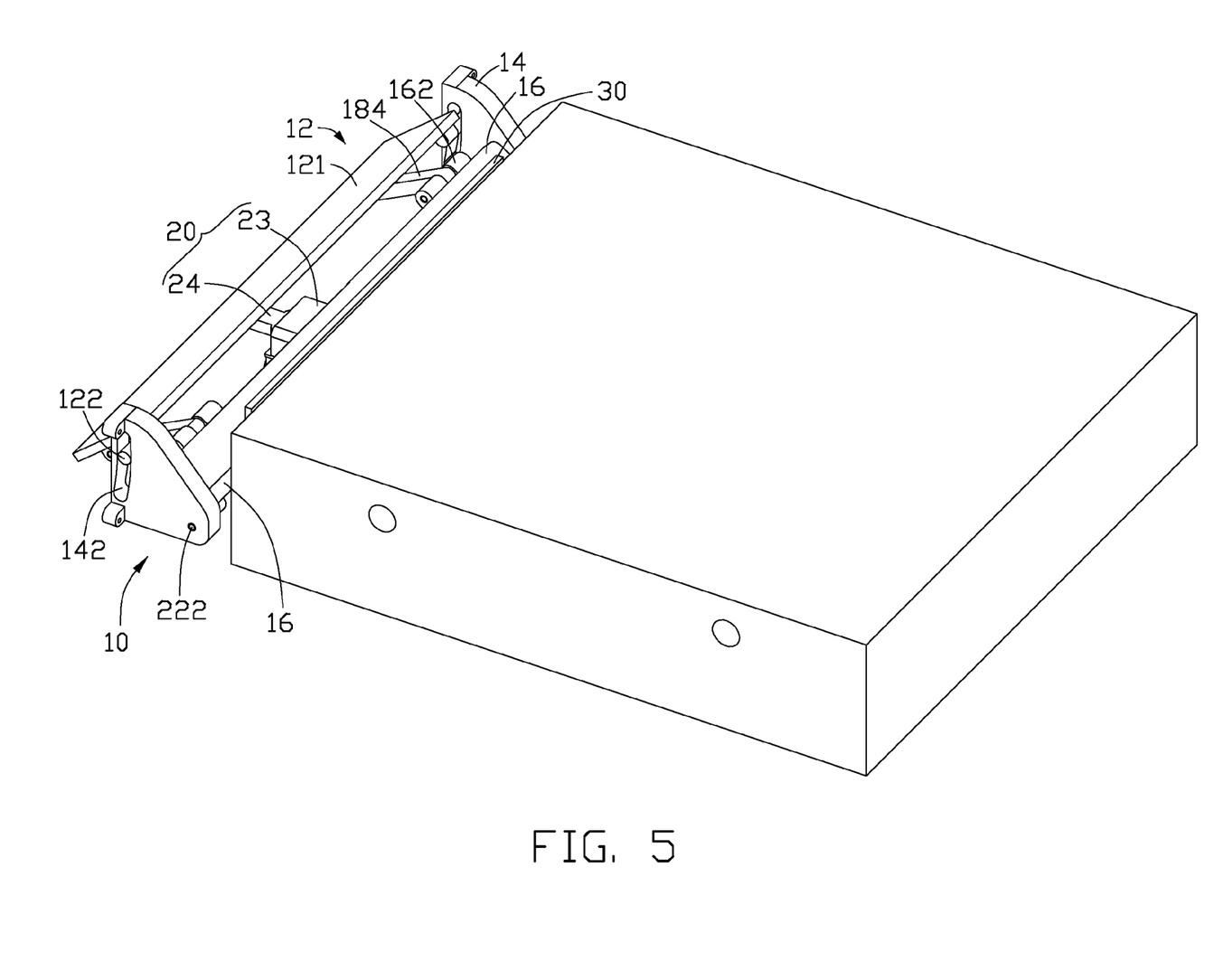
FIG. 5 is an assembled, isometric view of the latching mechanism for folding drive bay door in FIG. 2, showing the cover panel in a halfway state.

Referring to FIGS. 2 and 5, when the optical disk drive 30 slides out of the personal computer, the optical disk drive 30 presses the rotatable member 16 downwards, and the rotatable member 16 rotates about the first connecting members 222. The connecting portions 162 of rotatable member 16 moves towards the rolling subassembly 20. The ends of the link members 184 connecting to the connecting portions 162 of rotatable member 16 will be driven to rotate towards the rolling subassembly 20 accordingly. Two ends of the elastic member 22 move towards each other, and the elastic member 22 becomes compressed. The pivotally rotatable portions 122 of the cover panel 12 slide along the guiding hole 142 of the bracket 14. The cover panel 12 rotates about the second connecting members 182 and moves towards the sleeve 23. When the cover panel 12 rotates, the rolling member 24 of the rolling subassembly 20 gradually rolls out of the sleeve 23. Thus, the pivotally rotatable portions 122 of the cover panel 12 cannot move in the guiding hole 142 abruptly, so that the rotation of the cover panel 12 is stable Referring to FIGS. 6 and 7, when the optical disk drive 30 slides further out of the personal computer, the optical disk drive 30 further pushes the rotatable member 16 to rotate. Each pivotally rotatable portion 122 of the cover panel 12 moves along the guiding hole 142 of the bracket 14 until the pivotally rotatable portion 122 resists the other end of the inner surface for forming the guiding hole 142. Thus, the cover panel 12 turns over, and is substantially perpendicular to the entrance 102 of the personal computer. The cover panel 12 is completely open relative to the entrance 102. The outer surface 121 of the cover panel 12 is adjacent to the optical disk drive 30. The elastic members 22 are in a maximum compressed state. The optical disk drive 30 passes through the entrance 102 and protrudes out of the personal computer.

Figure 6:
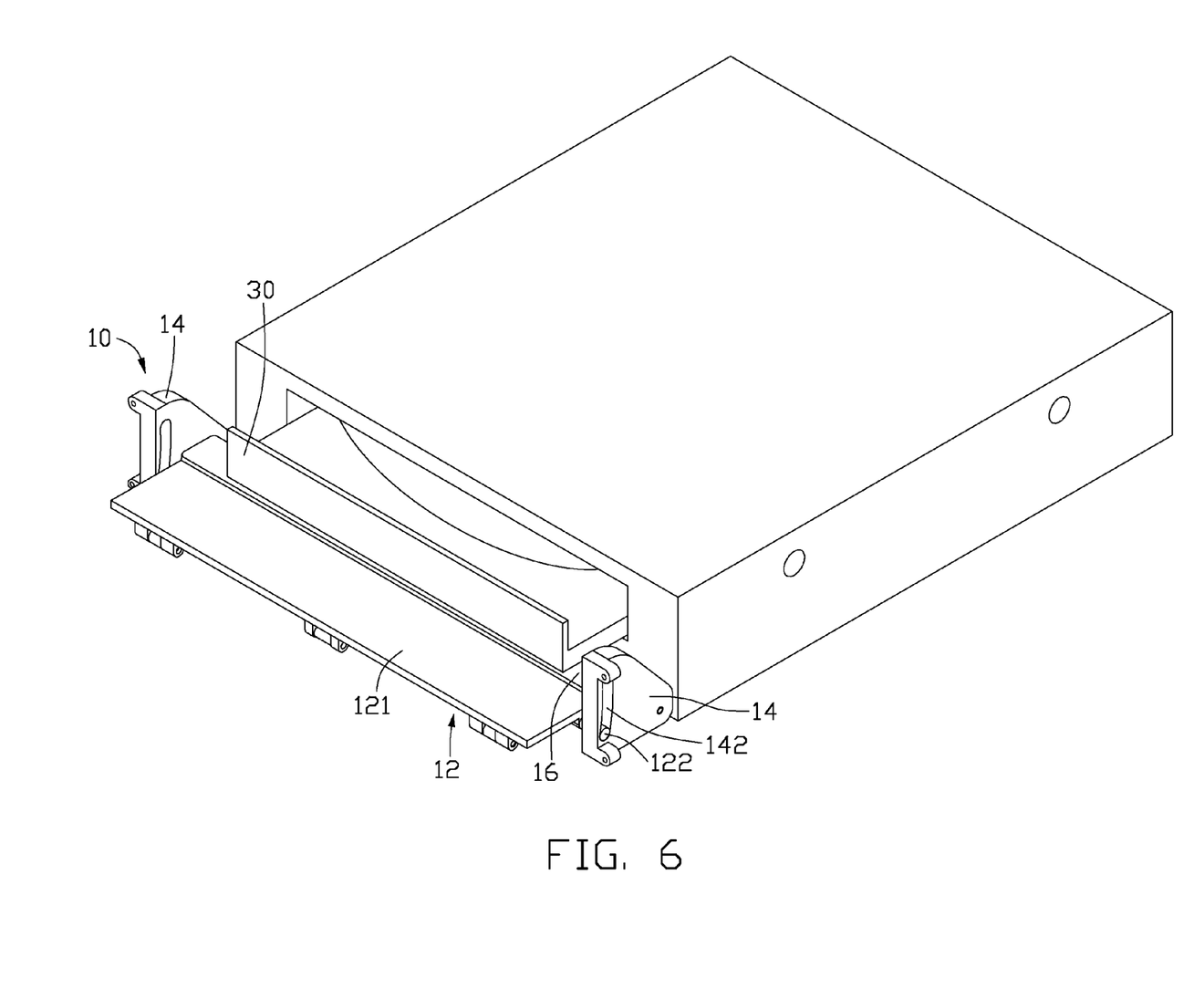
FIG. 6 is an assembled, isometric view of an open state of the latching mechanism for an optical disk drive of FIG. 2.
Figure 7:
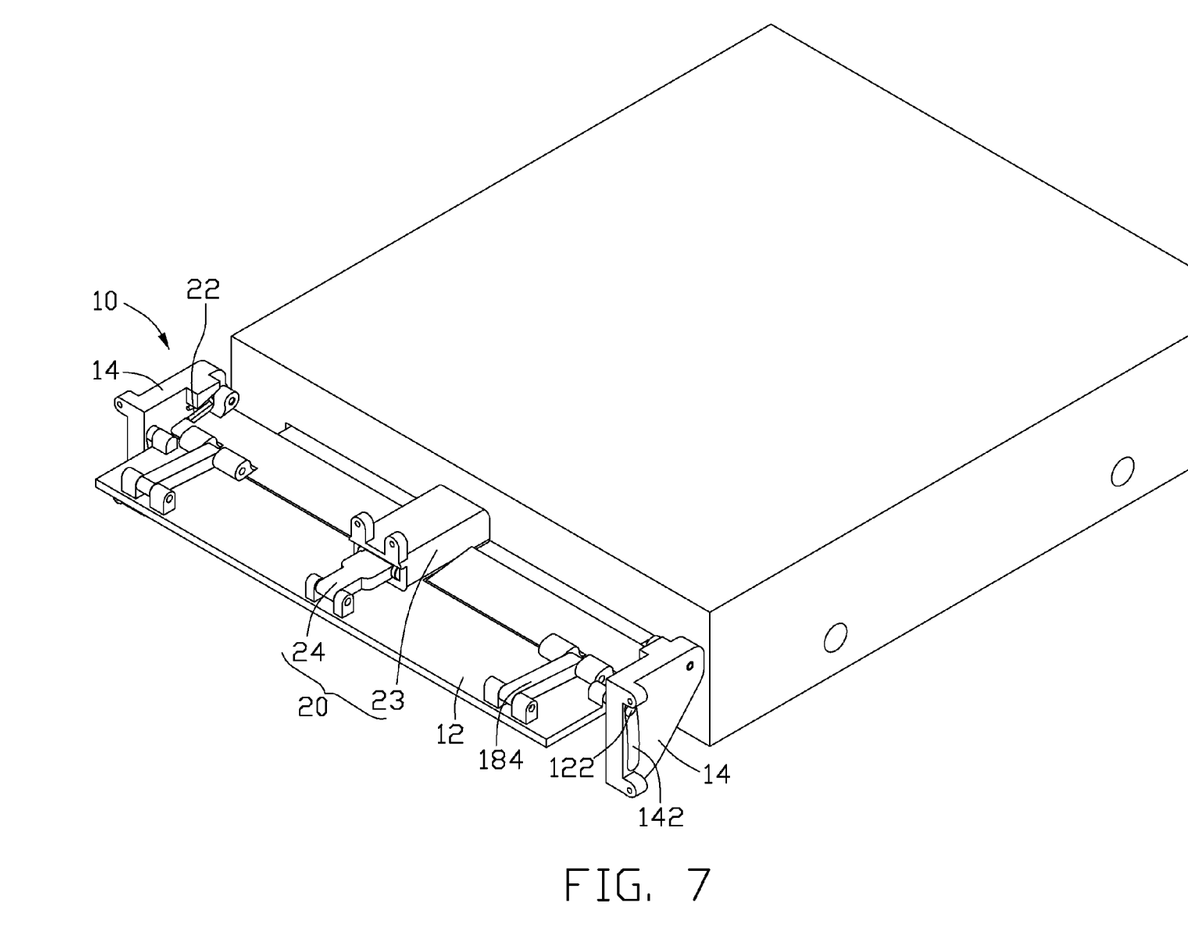
FIG. 7 is similar to FIG. 6, but shows a view from an opposite aspect.

It should be understood that, during the opening of the cover panel 12, the outer surface 121 of the cover panel 12 is always exposed to the users. The inner surface 120 of the cover panel 12, the ears 124 formed on the inner surface 120, the connecting subassemblies 18, and the rolling subassembly 20 cannot be seen. Therefore, the latching mechanism for the folding drive bay door 10 has a nice appearance.

When the optical disk drive 30 slides into the personal computer, the elastic members 22 create an elastic force to push the rotatable member 16 to rotate about the first connecting members 222. The rotatable member 16 drives the link members 184 to rotate. The pivotally rotatable portions 122 of the cover panel 12 are driven to move along the guiding hole 142. The rolling member 24 rolls into the sleeve 23 until the cover panel 12 covers the entrance 102 of the personal computer.

The latching mechanism for the folding drive bay door 10 is disposed in the personal computer. The cover panel 12 can be completely open or closed relative to the personal computer. There is no slot between the cover panel 12 and the first panel 100 of the personal computer, so that the personal computer has a nice appearance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A latching mechanism for folding drive bay door, comprising:
 a cover panel configured for covering an entrance of an electronic device, the cover panel forming two pivotally rotatable portions on opposite ends thereof;
 two brackets fixed to the electronic device, each of the brackets defining a guiding hole for receiving one of the pivotally rotatable portions of the cover panel;
 at least one link member, one end of each of the at least one link member rotatably connected to the cover panel;

a rotatable member rotatably connected to the brackets, a second end of each of the at least one link member rotatably connected to the rotatable member; and at least one elastic member, two ends of each of the at least one elastic member resisting one of the two brackets and the rotatable member correspondingly, wherein the latching mechanism further comprises a rolling subassembly, the rolling subassembly includes a sleeve and a rolling member; the sleeve is fixed to the electronic device; the rolling subassembly is rotatably connected to the cover panel, and the rolling member rolls in the sleeve.

2. The latching mechanism for folding drive bay door as claimed in claim 1, wherein the brackets and the electronic device are integrally formed.

3. The latching mechanism for folding drive bay door as claimed in claim 1, wherein the rolling member includes a casing, two rollers, two bolts, and two covers, one end of the casing is rotatably connected to the cover panel, a second end of the casing defines two engaging holes, each of the bolts is passed through one cover and one engaging hole of the casing, and then engages with one roller.

4. The latching mechanism for folding drive bay door as claimed in claim 1, wherein the rotatable member defines a groove therein, the sleeve of the rolling subassembly is partially engaged in the groove.

5. The latching mechanism for folding drive bay door as claimed in claim 1, wherein the number of the at least one link member is two, the link members are parallel to each other, when the cover panel covers the entrance of an electronic device, angles between the link members and the cover panel and the rotatable member are acute angles.

6. The latching mechanism for folding drive bay door as claimed in claim 1, wherein each bracket forms a resisting portion, two ends of each elastic member resist the resisting portion of the bracket and a side surface of the rotatable member correspondingly.

7. The latching mechanism for folding drive bay door as claimed in claim 1, wherein the rotatable member is substantially an arched plate.

8. The latching mechanism for folding drive bay door as claimed in claim 1, wherein the guiding holes of the brackets are approximately strip-shaped, when the cover panel covers the entrance of the electronic device, each pivotally rotatable portion of the cover panel resists one end of an inner surface for forming the guiding hole, when the cover panel is open relative to the entrance of the electronic device, each pivotally rotatable portion of the cover panel resists a second end of the inner surface for forming the guiding hole.

9. The latching mechanism for folding drive bay door as claimed in claim 1, wherein in the process of opening the cover panel, the rotatable member is capable to be pushed by an optical disk drive to rotate, the cover panel is capable to turn over, and the at least one elastic member is capable to be compressed.

10. The latching mechanism for folding drive bay door as claimed in claim 9, wherein in the process of closing the cover panel, the optical disk drive slides into the electronic device, the at least one elastic member is capable to create an elastic force and push the cover panel to cover the entrance of the electronic device.

11. A latching mechanism for folding drive bay door, comprising:

a cover panel configured for covering an entrance of an electronic device, the cover panel movably connected to the electronic device;

at least one link member, one end of each of the at least one link member rotatably connected to the cover panel;

a rotatable member rotatably connected to the electronic device, a second end of each of the at least one link member rotatably connected to the rotatable member; and at least one elastic member, two ends of each of the at least one elastic member resisting the electronic device and the rotatable member correspondingly, wherein the latching mechanism further comprises a rolling subassembly, the rolling subassembly includes a sleeve and a rolling member; the sleeve is fixed to the electronic device; the rolling subassembly is rotatably connected to the cover panel, and the rolling member rolls in the sleeve.

12. The latching mechanism for folding drive bay door as claimed in claim 11, wherein the rolling member includes a casing, two rollers, two bolts, and two covers, one end of the casing is rotatably connected to the cover panel, a second end of the casing defines two engaging holes, each of the bolts is passed through one cover and one engaging hole of the casing, and then engages with one roller.

13. The latching mechanism for folding drive bay door as claimed in claim 11, wherein the rotatable member defines a groove therein, the sleeve of the rolling subassembly is partially engaged in the groove.

* * * * *